US008290070B2

(12) United States Patent
Guerrieri et al.

(10) Patent No.: US 8,290,070 B2
(45) Date of Patent: Oct. 16, 2012

(54) METHOD FOR THE TRANSMISSION ON MULTIPLE-CARRIER COMMUNICATIONS SYSTEMS, AND CORRESPONDING TRANSMITTER AND COMPUTER-PROGRAM PRODUCT

(75) Inventors: Lorenzo Guerrieri, Aosta (IT); Eleonora Guerrini, Aosta (IT); Daniele Veronesi, Aosta (IT); Paola Bisaglia, Padua (IT)

(73) Assignee: Dora S.p.A., Aosta (IT)

( * ) Notice: Subject to any disclaimer, the term of this patent is extended or adjusted under 35 U.S.C. 154(b) by 841 days.

(21) Appl. No.: 12/323,291

(22) Filed: Nov. 25, 2008

(65) Prior Publication Data
US 2009/0135934 A1    May 28, 2009

(30) Foreign Application Priority Data
Nov. 26, 2007   (IT) .............. TO2007A0850

(51) Int. Cl.
*H04K 1/10* (2006.01)
(52) U.S. Cl. ........................ 375/260; 375/267
(58) Field of Classification Search ......... 375/260–261, 375/267; 370/204, 211
See application file for complete search history.

(56) References Cited

U.S. PATENT DOCUMENTS

| | | | |
|---|---|---|---|
| 5,521,906 A | 5/1996 | Grube et al. |
| 5,541,955 A | 7/1996 | Jacobsmeyer |
| 5,960,003 A | 9/1999 | Fischer et al. |
| 6,005,893 A | 12/1999 | Hyll |
| 6,072,779 A | 6/2000 | Tzannes et al. |
| 6,122,247 A | 9/2000 | Levin et al. |
| 6,134,273 A | 10/2000 | Wu et al. |
| 6,181,714 B1 | 1/2001 | Isaksson et al. |
| 6,222,888 B1 | 4/2001 | Kao et al. |
| 6,400,773 B1 | 6/2002 | Krongold et al. |
| 6,459,678 B1 | 10/2002 | Herzberg |
| 6,516,027 B1 | 2/2003 | Kapoor et al. |
| 6,553,534 B2 | 4/2003 | Yonge, III et al. |
| 6,690,736 B1 | 2/2004 | Andre |
| 6,704,367 B1 | 3/2004 | Wang et al. |
| 6,732,281 B1 | 5/2004 | Mantri et al. |
| 6,807,227 B2 | 10/2004 | Chien |
| 6,807,234 B2 | 10/2004 | Hansen |

(Continued)

OTHER PUBLICATIONS

Katar et al., "Channel Adaptation based on Cyclo-Stationary Noise Characteristics in PLC Systems," IEEE International Symposium on Power Line Communications and Its Applications, 2006, pp. 16-21.

(Continued)

*Primary Examiner* — Emmanuel Bayard
(74) *Attorney, Agent, or Firm* — Seed IP Law Group PLLC (57) ABSTRACT

A method for loading bits over a set of subcarriers of a multiple-carrier communications system comprises the operation of associating with the subcarriers respective numbers of bits chosen from among a plurality of available constellations. The method envisages definition of a performance target for the system and execution of bit loading, guaranteeing the aforesaid target on a plurality of subcarriers. The performance target can be a target error rate, such as a bit-error rate (BER), or else be transferred into a constraint, such as, for example, a threshold, in a metric of log-likelihood ratios (LLRs). In this case, there is preferably envisaged application to the signals received within the multiple-carrier system a function that estimates a signal to noise ratio on each sub-carrier. The aforesaid metric of log-likelihood ratios (LLRs) is hence defined as a function of said signal to noise ratios.

26 Claims, 3 Drawing Sheets

U.S. PATENT DOCUMENTS

| | | | |
|---|---|---|---|
| 6,829,307 B1 | 12/2004 | Hoo et al. | |
| 6,842,491 B2 | 1/2005 | Gelblum et al. | |
| 6,856,947 B2 | 2/2005 | Antoine et al. | |
| 6,870,888 B1 | 3/2005 | Shapiro et al. | |
| 7,003,044 B2 | 2/2006 | Subramanian et al. | |
| 7,012,883 B2 | 3/2006 | Jalali et al. | |
| 7,020,073 B2 | 3/2006 | Kadous et al. | |
| 7,061,986 B2 | 6/2006 | Tonissen et al. | |
| 7,110,467 B2 | 9/2006 | Mitlin et al. | |
| 7,126,996 B2 | 10/2006 | Classon et al. | |
| 7,131,038 B2 | 10/2006 | Mitlin et al. | |
| 7,137,047 B2 | 11/2006 | Mitlin et al. | |
| 7,145,956 B2 | 12/2006 | Koifman | |
| 7,177,367 B2 | 2/2007 | Storm | |
| 7,187,717 B2 | 3/2007 | Brossier et al. | |
| 7,200,178 B2 | 4/2007 | Shoemake et al. | |
| 7,203,459 B2 | 4/2007 | Goldstein et al. | |
| 7,213,197 B2 | 5/2007 | Jacobsen et al. | |
| 7,474,640 B2* | 1/2009 | Doron et al. | 370/328 |
| 2002/0118766 A1* | 8/2002 | Mitlin et al. | 375/261 |
| 2003/0097623 A1* | 5/2003 | Razavilar et al. | 714/704 |
| 2004/0001552 A1* | 1/2004 | Koifman | 375/260 |
| 2005/0031047 A1* | 2/2005 | Maltsev et al. | 375/260 |
| 2005/0047517 A1* | 3/2005 | Georgios et al. | 375/267 |
| 2005/0135497 A1* | 6/2005 | Kim et al. | 375/267 |
| 2007/0121741 A1* | 5/2007 | Tang et al. | 375/260 |
| 2008/0232499 A1 | 9/2008 | Guerrieri et al. | |
| 2008/0285686 A1* | 11/2008 | Beaulieu et al. | 375/329 |
| 2009/0196369 A1* | 8/2009 | Dasgupta et al. | 375/260 |

OTHER PUBLICATIONS

Krongold et al., "Computationally Efficient Optimal Power Allocation Algorithms for Multicarrier Communication Systems," IEEE Transactions on Communications, 48(1):23-27, Jan. 2000.

Leke et al., "A Maximum Rate Loading Algorithm for Discrete Multitone Modulation Systems," IEEE Global Telecommunications Conference, vol. 3, GLOBECOM, Phoenix, AZ, Nov. 3-8, 2007, pp. 1514-1518.

Li et al., "Mutual-Information-Based Adaptive Bit-Loading Algorithms for LDPC-Coded OFDM," IEEE Transactions on Wireless Communications, 6(5):1670-1680, May 2007.

Pauluzzi et al., "A Comparison of SNR Estimation for the AWGN Channel," IEEE Pacific Rim Conference on Communications, Computers, and Signal Processing, Victoria, B.C., May 17-19, 1995, pp. 36-39.

Philipps, H. "Modelling of Powerline Communication Channels," Institute for Communications Technology, Braunschweig Technical University, Braunschweig, Germany, pp. 14-21.

She et al., "Power and Bit Allocation for Adaptive Turbo Coded Modulation in OFDM Systems," IEEE Global Telecommunications Conference, vol. 2, GLOBECOM, Dec. 1-5, 2003, pp. 903-907.

Sonalkar et al., "An Efficient Bit-Loading Algorithm for DMT Applications," IEEE Communications Letters, 4 (3):80-82, Mar. 2000.

Vogt et al., "Improving the max-log-MAP turbo decoder," Electronics Letters, 36(23):1937-1939, Nov. 9, 2000.

Wyglinski et al., "Bit Loading With BER-Constraint for Multicarrier Systems," IEEE Transactions on Wireless Communications, vol. 4, pp. 1383-1387, Jul. 2005.

Ye et al., "Adaptive modulation and code rate for turbo coded OFDM transmissions," IEEE 65th Vehicular Technology Conference, Apr. 22-25, 2007, pp. 2702-2706.

Baccarelli et al., "Novel Efficient Bit-Loading Algorithms for Peak-Energy-Limited ADSL-Type Multicarrier Systems," IEEE Transactions on Signal Processing, 50(5):1237-1247, May 2002.

Bahl et al., "Optimal Decoding of Linear Codes for Minimizing Symbol Error Rate," IEEE Transactions on Information Theory, 20(2):284-287, Mar. 1974.

Bingham, J. A.C., "Multicarrier Modulation for Data Transmission: An Idea Whose Time Has Come," IEEE Communications Magazine, pp. 5-14, May 1990.

Benvenuto et al., "On the Selection of Adaptive Modulation and Coding Modes over OFDM," IEEE International Conference on Communications, vol. 6, pp. 3251-3255, Jun. 20-24, 2004.

Berrou et al., "The Advantages of Non-Binary Turbo Codes," Proceedings of the IEEE Information Theory Workshop, Cairns, Qld., Australia, Sep. 2, 2001-Sep. 7, 2001, pp. 61-63.

Berrou et al., "Multidimensional turbo codes," Information Theory and Networking Workshop, Metsovo, Greece, Jun. 27, 1999-Jul. 1, 1999, p. 27.

Berrou et al., "Near Shannon Limit Error—Correcting Coding and Decoding: Turbo-Codes(1)," Technical Program, Conference Record, IEEE International Conference on Communications, vol. 2, Geneva, Switzerland, pp. 1064-1070, May 23-26, 1993.

Campello, J. "Practical Bit Loading for DMT," IEEE International Conference on Communications, vol. 2, Vancouver, B.C., Jun. 6, 1999-Jun. 10, 1999, pp. 801-805.

Canete et al., "Fundamentals of the Cyclic Short-Time Variation of Indoor Power-line Channels," International Symposium on Power Line Communications and Its Applications, Apr. 6-8, 2005, pp. 157-161.

Chow et al., "A Practical Discrete Multitone Transceiver Loading Algorithm for Data Transmission over Spectrally Shaped Channels," IEEE Transactions on Communications, 43(2/3/4):773-775, Feb./Mar./Apr. 1995.

Fischer et al., "A New Loading Algorithm for Discrete Multitone Transmission," GLOBECOM Global Telecommunications Conference "Communications: The Key to Global Prosperity," vol. 1, pp. 724-728, Nov. 18-22, 1996.

Campello, J. "Optimal Discrete Bit Loading for Multicarrier Modulation Systems," IEEE International Symposium on Information Theory, Cambridge, MA, Aug. 16-21, 1998, p. 193.

Ghosh et al "Broadband Wireless Access with WiMax/802.16: Current Performance Benchmarks and Future Potential," IEEE Communications Magazine, 43(2):129-136, Feb. 2005.

Guerrieri et al., "LLR-based bit-loading algorithm for the turbo coded HomePlug AV," IEEE Global Telecommunications Conference, GLOBECOM, pp. 140-145, Nov. 26-30, 2007.

Guerrieri et al., "Performance of the turbo coded HomePlug AV system over power-line channels," IEEE International Symposium on Power Line Communications and Its Applications, Mar. 26-28, 2007, pp. 138-143.

Guerrini et al., "Bit-loading algorithms and SNR estimate for HomePlug AV," IEEE International Symposium on Power Line Communications and Its Applications, Mar. 26-28, 2007, pp. 77-82.

Hanzo et al., "Single and Multi-carrier Quadrature Amplitude Modulation: Principles and Applications for Personal Communications, WLANs and Broadcasting," John Wiley & Sons, Ltd., West Sussex, England, 2000, Chapter 22, pp. 501-512.

INT 6300 HomePlug AV High-Speed Powerline Solution, Specification, Intellon Corporation, 2007.

HomePlug AV White Paper, HomePlug Powerline Alliance, Inc., 2005.

Zimmermann et al., "Analysis and Modeling of Impulsive Noise in Broad-Band Powerline Communications," IEEE Transactions on Electromagnetic Compatibility, 44(1):249-258, Feb. 2002.

Philipps, H., "Modelling of Powerline Communication Channels," Proceedings of the 3rd International Symposium on Power-Line Communications And Its Application (ISPLC '99), 1999, pp. 14-21.

* cited by examiner

METHOD FOR THE TRANSMISSION ON MULTIPLE-CARRIER COMMUNICATIONS SYSTEMS, AND CORRESPONDING TRANSMITTER AND COMPUTER-PROGRAM PRODUCT

BACKGROUND

1. Technical Field

The present invention relates to communication techniques and has been developed with particular attention paid to its possible use in communications systems that are able to support high data rates on different transmission channels (for example, power lines, wireless channels, etc.).

The description of the present application is made with reference to the documents that appear in the section entitled "References" at the foot of the description. In order not to burden the treatment, in the course of the description said documents are designated by a number in square brackets (for example, [X]), which enables identification of each document appearing in the list of references.

2. Description of the Related Art

The need to have available communications systems of the type outlined previously has increased considerably over the years. For this purpose, the world of research and design in the communications sector (for example, in the modem sector) has oriented its attention towards multi-carrier-modulation (MCM) techniques such as multiplex schemes of the discrete multi-tone (DMT) or orthogonal-frequency-division-multiplexing (OFDM) type.

Instead of employing single-carrier modulation with a very complex adaptive equalizer, the fact of employing an MCM technique with a channel divided into N subchannels means that the subchannels are basically independent Gaussian channels free from intersymbol interference (ISI). As illustrated in [1], another advantage of MCM techniques as compared to single-carrier systems lies in the considerable immunity in regard to impulsive noise and fast-fading phenomena. In MCM systems, each subchannel (or subcarrier, in what follows the two terms will be considered in effect to be equivalent) can be "loaded" in a different way, and the number of bits per subcarrier can be chosen as a function of the signal-to-noise ratio (SNR) estimated on each subcarrier prior to transmission of the data. Typically, the subcarriers with low signal-to-noise ratio are loaded with an accordingly reduced number of bits, there being associated thereto more robust modulations (for example, BPSK, 4-QAM, etc.). The subcarriers with higher signal-to-noise ratio are loaded with a larger number of bits, there being associated therewith modulations of higher order (for example 256-QAM, 1024-QAM, etc.). Said criteria are illustrated, for example, in [2].

The process that associates with each available subcarrier the number of bits to be transmitted or, equivalently, the size of the constellation amongst the constellations available is referred to as "bit-loading".

In order to enhance the reliability of the communication, a coding is used during transmission. Coding introduces redundancy in the information sent over the communication channels in order to determine correctly the data in the presence of errors during transmission. As regards the coding techniques, block coding and convolutional coding are amongst the most frequently used ones. In particular, a few years ago a new class of codes, referred to as "turbo codes", was introduced, which are based upon the parallel concatenation of two recursive convolutional codes separated by an interleaver of a turbo type, as described in [3], which demonstrates the possibility of obtaining levels of performance that approach the Shannon limit.

Thanks to this exceptional performance, the turbo codes have found many applications. Amongst the most recent there may be mentioned, for example, the use of OFDM schemes that employ QAM modulations subjected to turbo convolutional coding in the WiMax (see [4]) and HomePlug AV (HPAV) (see [5] and [6]) contexts.

In the past, the problem of bit-loading has been tackled using fundamentally two different optimization techniques, which lead to two types of approaches, referred to, respectively, as "rate-adaptive" and "margin-adaptive" [8].

The rate-adaptive solutions (see, for example, [9] and [10]) aim at maximizing the overall throughput of the system with a constraint on the transmission power. The solutions of a margin-adaptive type (as described, for example, in [11], [12], and [13]) aim, instead, at minimizing the transmission power with a constraint on the overall throughput of the system. Both types of solution are based upon the possibility of redistributing the power and the bits over the various OFDM subcarriers as a function of the estimated signal-to-noise ratio.

Communications systems can be on the other hand be subject to limitations of a normative type, which do not enable exploitation of schemes of power re-allocation. A typical example of this is the HPAV system referred to previously. It follows that the two approaches described above cannot be applied to systems of this type.

There have recently been proposed (see [14]) two bit-loading techniques of a discrete iterative and rate-adaptive type, with a non-adaptive power allocation, within the framework of an uncoded wireless system.

In [15] two different bit-loading techniques are described, with uniform power allocation, once again for an uncoded HPAV system. All these solutions aim at maximizing the overall throughput of the system, at the same time guaranteeing that the bit-error rate (BER) remains below a given threshold. However, when applied to a coded system, these techniques do not exploit the error-correction capabilities of the code, which means that the target BER is satisfied with ample margin, but at the expense of a reduction in terms of throughput. In the context of bit-loading and coding it may in fact be noted that the problem of maximizing the throughput and of obtaining in the meantime a target BER is frequently tackled by adapting the power and transmission mode, i.e., the rate of the encoder and the size of the constellation (see in this connection [16] and [17]). In this case, each subcarrier or a block of adjacent subcarriers is selected, and, on the basis of the channel characteristics, a transmission mode for the entire block is chosen taking into account the constraints imposed by the system.

Even though it is possible to combine bit-loading with coding, none of these techniques can be applied to systems that do not allow exploitation of power re-allocation.

Documents such as [18], [19], [20], [21], and [22] refer to yet another approach, in which an attempt is made to extend to a coded MCM system the classic bit-loading formula for an uncoded system, as defined in [11]:

$$b_k = \log_2\left(1 + \frac{SNR_k}{\Gamma}\right). \tag{1}$$

where $b_k$ and $SNR_k$ are, respectively, the number of bits to be loaded and the signal-to-noise ratio estimated on the subcarrier k, and $$\Gamma = \frac{\left(Q^{-1}\left(\frac{SER}{4}\right)\right)^2}{3} \gamma_m \quad (2)$$

is the SNR gap calculated starting from the target symbol-error rate (SER) using the Gaussian complementary distribution function given by $$Q(x) = \frac{1}{\sqrt{2\pi}} \int_x^{+\infty} \mathrm{Exp}\left(-\frac{z^2}{2}\right) dz$$

where $\gamma_m$ is a margin introduced to take into account intrinsic system problems such as the presence of impulsive noise, the variance of the SNR estimate and other elements.

In the extension proposed for coded systems in [18], [19], [20], [21], and [22], the SNR gap is modified to $$\Gamma = \frac{\frac{\left(Q^{-1}\left(\frac{SER}{4}\right)\right)^2}{3} \gamma_m}{\gamma_c} \quad (3)$$

where the term $\gamma_c$ represents the coding gain.

Documents such as [23] highlight, however, the fact that this empirical approach is an obstacle to precision in determination of the constellation, in particular when the coding gain exhibits a high variability as a function of the size of the constellation.

Amongst the works that attempt to combine more efficiently the two concepts of bit-loading and coding, it is possible to cite [24], as regards the Reed-Solomon coding systems, and [25], as regards finite-impulse-response (FIR) codes such as common block codes and non-recursive convolutional codes. Analyzed in [26] is the performance of an LDPC-coded OFDM system with adaptive bit-loading based upon mutual information, given that the mutual information provides a characterization of the performance of LDPC-coded modulation systems. Presented in [23] is a bit-loading method based upon the calculation of a so-called input-output weight enumerating function (IOWEF) of the code for systems that enable a decoding of a soft type.

The authors of [23] have noted that this method proves effective if applied to systems with convolutional codes subject to Viterbi decoding or with BCH codes decoded with Chase decoding and also in the case of turbo product codes with serially concatenated BCH codes.

There exists, however, an intrinsic difficulty in identifying the exact theoretical performance of the coding and in correlating it directly to the performance in the uncoded case. This means that this solution does not operate in a satisfactory way with traditional turbo codes (such as the ones presented in [3]) or with non-binary turbo codes (such as the ones presented in [27]) or else with multidimensional turbo codes (such as the ones presented in [28]).

Described in [29] is a bit-loading method for turbo codes in a multichannel system. The corresponding method is characterized by two steps:

i)—application of the algorithm referred to as BER-threshold-constrained (BTC) algorithm (see [15]); and ii)—application, during allocation, of the relation $b_{k,p} = b_{k,q}$. In this case, $b_k$ is the number of bits allocated on the subcarrier k after application of the previous step, and said term $b_k$ can be seen as the sum of three terms: $b_k = b_{k,s} + b_{k,p} + b_{k,q}$, where $b_{k,s}$ is the number of information bits, $b_{k,p}$ is the number of parity bits linked to the first, constituent, encoder, and $b_{k,q}$ is the number of parity bits linked to the second, constituent, encoder.

The BTC algorithm described in [15] applied in the first step is a classic traditional starting point for various bit-loading algorithms, such as the ones described in [30], [31], and [32]. However, as has already been said, it does not enable a complete exploitation of the code correction capabilities.

The refinement achieved with step ii) is interesting given that it enables balancing of the quality of the parity log-likelihood ratios (LLRs) at input to two decoders of the soft-input/soft-output (SISO) type that constitute the turbo decoder, maximizing their co-operation. However, the corresponding algorithm proves conservative in terms of BER, thus penalizing the throughput performance. In addition, if it is taken into account that the communications systems adopt a channel interleaver to cope with burst noise, the intrinsic suggestion in point ii) seen above better suits to the design of the channel interleaver than to the bit-loading technique. This in so far as, at a bit-loading level, there arises the unnecessary additional complication of distinguishing the bits generated by the two constituent encoders.

From the foregoing description, the present applicant has reasons to believe that there is still felt the need to have available a bit-loading technique that is truly efficient and satisfactory (in particular, in terms of throughput) in the case of systems with MCM turbo coding.

BRIEF SUMMARY

One embodiment satisfies the need outlined previously.

One embodiment is a method having the characteristics recalled specifically in the ensuing claims. Some embodiments include a corresponding transmitter as well as a computer-program product, which can be loaded into the memory of at least one computer and comprises software code portions that are able to implement the steps of the method when the product is run on at least one computer. As used herein, the reference to such a computer-program product is understood as being equivalent to reference to a medium that can be read by a computer and contains instructions for controlling the processing system for coordinating implementation of the method according to the invention. The reference to "at least one computer" is evidently intended to highlight the possibility for the method to be implemented in a modular and/or distributed form.

The claims form an integral part of the technical disclosure as provided herein.

One embodiment enables provision of a bit-loading method adapted to a coded MCM system. In order to exploit the error-correction capabilities of the code more fully, this solution aims at maximizing the throughput, at the same time guaranteeing a target error rate (BER if the target is a bit error rate) on a set of subcarriers using a new metric based upon the log-likelihood ratios (LLRs) at output from the de-mapper of the soft-output (SO) type (see in this regard [7]). In one embodiment, starting from the modulation symbols received, the SO de-mapping module supplies information of a soft type on the coded bits. In one embodiment, this block is followed by the channel-de-interleaver block, the de-puncturing block and the decoder block.

One embodiment can be used advantageously also with MCM systems with different codings and in which, however, the performance of the code can be characterized in terms of the LLRs at output from the SO de-mapping block.

One or more embodiments do not prevent use of loading techniques when power allocation loading is allowed by the system constraints, given that the distribution of the power over the (sub)carriers can be cascaded to the implementation of the solution described herein.

BRIEF DESCRIPTION OF THE SEVERAL VIEWS OF THE DRAWINGS

The invention will now be described purely by way of non-limiting example, with reference to the annexed plates of drawings, in which.

DETAILED DESCRIPTION

Figure 1:
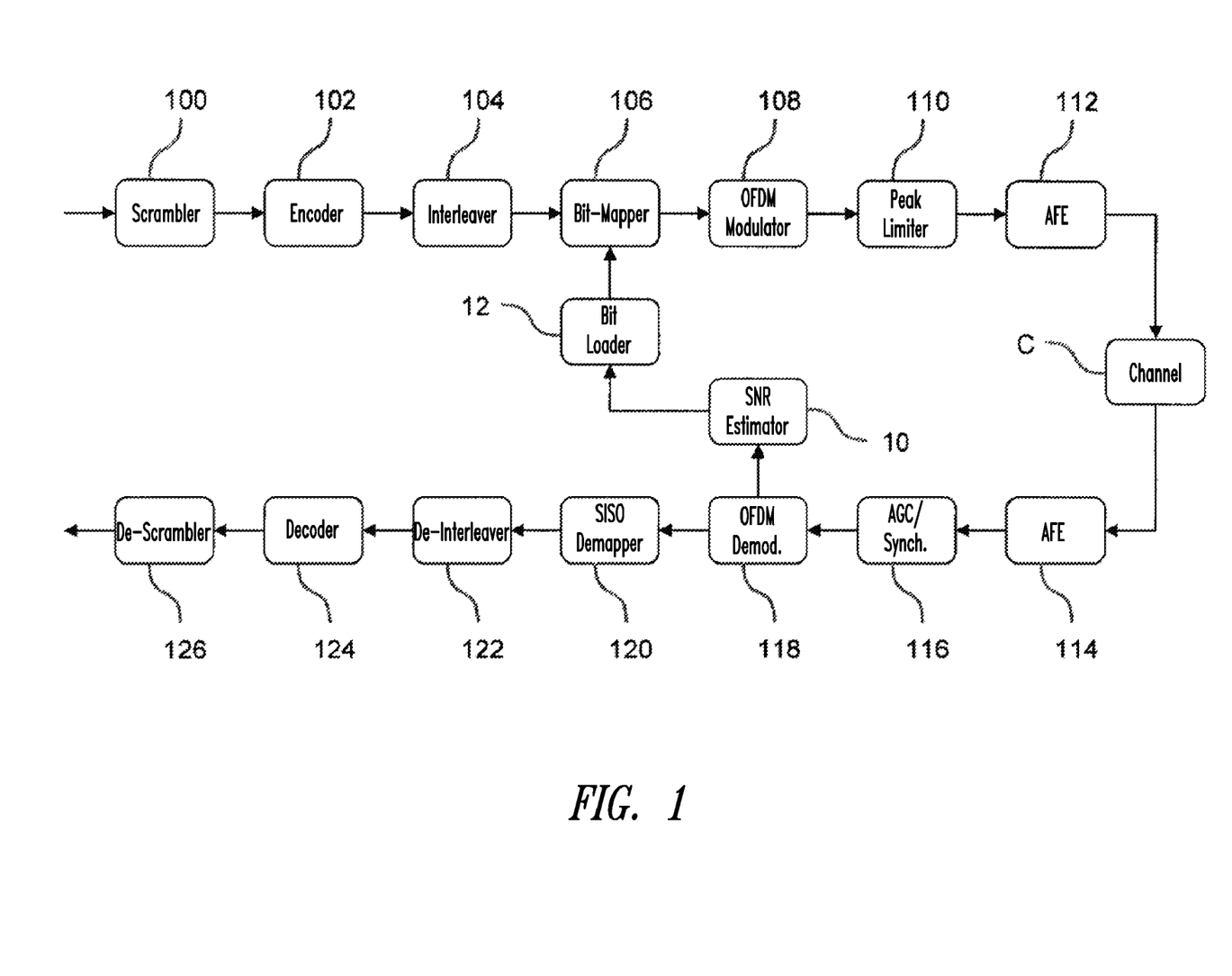
FIG. 1 is a block diagram of a transmission system which may be applied to the solution described herein.

The block diagram of FIG. 1 represents a communications system, in which the solution described herein can find application.

The example of embodiment described here regards in particular a system of the HPAV type, which, except for the specific elements of difference referred to in greater depth in what follows, can basically be reduced to the general scheme represented in the document [5]. The persons skilled in the art will readily appreciate, on the other hand, that the solution described herein can be applied also to contexts that differ from what has been illustrated herein purely by way of non-limiting example, which regards precisely an HPAV physical layer of the same type as the one described, not only in [5] already referred to, but also in [6]. The latter document points out in particular that the input bits from the MAC layer are structured in a different way in the case of the HPAV transmitter according to whether they are HPAV data, HPAV control information, or else control information of the HomePlug 1.0 type. In the context of the present description reference will, however, be made, for simplicity, just to the HPAV data format.

In summary, at the transmission end, the information bits are first subjected to scrambling in a scrambler 100 and are then fed into a turbo convolutional encoder 102; for example, the code rate can be R=1/2 and, after the puncturing operation, R=16/21. For each code rate, different turbo interleaver lengths L are possible. With the values indicated, the HPAV system supplies "raw" data rates of approximately 98 Mb/s and 150 Mb/s, respectively.

The coded sequences are then subjected to a bit-by-bit interleaving operation in an interleaver 104 and then converted into symbols, which belong to one of the available constellations, through a bit-mapper module 106. All the HPAV modulations possible have unitary average power.

Next, the data symbols are converted from the serial format into the parallel format for OFDM modulation implemented in an OFDM modulator 108. In an HPAV system, the OFDM modulation can be obtained using an 3072-point inverse discrete Fourier transform (IDFT). In addition, for reasons of compliance with certain standards (such as, for example, the ones in force in the United States), for useful transmission it is possible to use, by way of example, only up to N=917 subcarriers. In any case, for reasons of simplicity and generality of exposition, the individual allocable subcarrier is indicated by the index k, with $1 \leq k \leq N$. Consequently, the index k does not give the position amongst the 3072 system subcarriers, but indicates the position amongst the 917 allocable subcarriers. In order to reduce the complexity of the receiver, a suitable cyclic prefix is used for removing both intersymbol interference (ISI) and inter-carrier interference (ICI). A peak-limiter block 110 minimizes the peak-to-average power ratio (PAPR) before the signal is sent to an analog block (the so-called analog-front-end or AFE block) 112 with a view to sending the resulting signal over the channel C.

The structure of the receiver is substantially dual with respect to the one illustrated, and envisages, after an AFE block 114 of the receiver, a block for automatic gain control (AGC) and time synchronization 116, which, in what follows, will be considered as operating ideally.

Removal of the cyclic prefix and OFDM demodulation is implemented in a block 118 (also in this case it will be assumed that the corresponding discrete Fourier transform—DFT—operates on 3072 points), and likewise assuming that the cyclic prefix has completely eliminated both intersymbol interference (ISI) and inter-carrier interference (ICI). For simplicity (the hypothesis is not, however, limiting) it will moreover be assumed that a perfect synchronization has been achieved and that the channel C is time invariant within each OFDM symbol, so that the signal received in the course of the generic OFDM symbol on the single allocable subcarrier k, for k=1 . . . , N, can be written as $$y_k = \sqrt{E_s} G_k a_k + n_k, \qquad (4)$$

where $E_s$, $a_k$, $G_k$, and $n_k$ are, respectively, the energy of the symbol transmitted, the symbol transmitted, the complex coefficient representing the channel frequency response, and the complex additive noise with variance $\sigma_k^2$, on the k-th subcarrier.

The output of the OFDM demodulator 118 is sent to a SISO de-mapping circuit 120, to a de-interleaver 122 and to a turbo convolutional decoder 124, which can be advantageously constituted by the decoder that implements the Bahl, Cocke, Jelinek and Raviv (BCJR) algorithm described in [33] according to the improved version Max-log-MAP described in [34].

Next, the bits supplied by the decoder are de-scrambled in a block 126 so as to reconstruct an estimation of the transmitted bits.

In order to complete the description of FIG. 1, the reference number 10 designates a module that makes the estimation of the signal-to-noise ratio (SNR) starting from the signal produced by the demodulator 118, whilst the reference number 12 designates a module, which, as a function of the estimate made in module 10, performs the bit-loading (bit mapping) function in the mapping block 106.

As regards the SISO de-mapper block 120, assume that A is one of the possible HPAV constellations with m bits per symbol (i.e., $m = \log_2 |A|$, where $|A|$ is the number of elements of A). The symbol transmitted on the subcarrier k is designated by $a_k = a_{I,k} + j a_{Q,k}$, (where I and Q are, respectively, the in-phase and quadrature components), whilst the corresponding sequence of coded bits is designated by $\{c_{1,k}, \ldots, c_{m,k}\}$. For each bit $c_{i,k}$, with i=1, . . . , m, the constellation A is divided into two partitions of complex symbols associated to the sequence of bits coded with a '0' at the position i, i.e., $S_i^{(0)}$, and to the complementary partition, $S_i^{(1)}$.

Designating the equalized signal by $z_k = y_k/(\sqrt{E_s} G_k)$ and introducing the notation $$D_{i,k} = \frac{1}{4}\left( \min_{\alpha \in S_i^{(0)}} |z_k - \alpha|^2 - \min_{\alpha \in S_i^{(1)}} |z_k - \alpha|^2 \right), \quad (5)$$

the LLR of the bits $c_{i,k}$, with $i=1, \ldots, m$, supplied by the SISO de-mapping module, can be approximated (see [7]) in the form $$l_{i,k} = \ln\left( \frac{P[c_{i,k} = 1 \mid y_k]}{P[c_{i,k} = 0 \mid y_k]} \right) \approx \underbrace{\frac{E_s |G_k|^2}{\sigma_k^2}}_{\gamma_k} (2 \cdot D_{i,k}), \quad (6)$$

where $E_s |G_k|^2 / \sigma_k^2 = \gamma_k$ is the SNR on the subcarrier k. Approximated expressions of $\{D_{i,k}\}$ and a description of the SISO de-mapper module may be found in [7].

The bit-loading function performed in the module 12 as described herein can be defined as a solution of an LLR-constrained type, i.e., constrained in terms of LLR. In what follows, this LLR-constrained solution is briefly indicated as "LC" solution.

In order to better exploit the error-correction capabilities of the turbo code, the LC solution exploits the following criteria:

i) guaranteeing the target BER over a set of subcarriers, instead of over a single subcarrier (as in the case of the BTC algorithm described in [15]);

ii) executing point i) shifting the target BER, $P_e^{(T)}$, into an LLR constraint.

In an embodiment of the solution described herein, the BTC algorithm is used as starting step of an LC implementation.

For this reason, the basic principles of the BTC algorithm will be recalled briefly in what follows.

As has already been said, the BTC algorithm aims at maximizing the overall throughput of the system with a uniform power allocation, guaranteeing a target BER for each subcarrier, as described for example in [15]. For a coded system, the performance in terms of BER as a function of SNR can be obtained also by simulations. For example, given in [35] are the results for the HPAV system. Consequently, for each constellation, it is possible to fix a constraint in terms of signal-to-noise ratio (SNR) for a given target BER.

Designated by $\gamma^{(m_k,T)}$ is the SNR constraint when $m_k$ bits are loaded on the k-th subcarrier, and by c is the set of all the possible numbers of bits that can be mapped in the generic symbol $a_k$. For the HPAV system, the possible modulations that can be used are: BPSK, 4-QAM, 8-QAM, 16-QAM, 64-QAM, 256-QAM and 1024-QAM; hence, C={1, 2, 3, 4, 6, 8, 10}.

With this notation, the problem solved by the BTC algorithm is $$\begin{cases} \max_{m_k \in C} m_k \\ \text{s.t. } \gamma_k \geq \gamma^{(m_k,T)} \end{cases} k = 1, \ldots, N, \quad (7)$$

where $\gamma_k$ is the SNR on the subcarrier k, given by Eq. (6).

Obviously, if $\gamma_k \leq \gamma^{(m_k,T)}$ for each $m_k \in C$ available, the k-th subcarrier is masked (i.e., no useful information is sent). The procedure uses a memory table of the look-up-table type, which contains, for each allowable modulation, the value of the equivalent SNR constraint.

Since, in general, MCM systems employ different code rates, and for each code rate R a number of interleaver lengths T are present, it would be more precise to write $\gamma^{(m_k,T,R,L)}$, thus highlighting that there exists a set of thresholds for each of the code rates R and for each of the available interleaver lengths L, given that it should be noted that $\gamma^{(m_k,T,R,L)}$ can also depend upon the generator polynomials if different encoders are present in the system. In what follows, once again for simplicity, it will be assumed that R and L are fixed, which, as persons skilled in the sector can readily appreciate, does not constitute a limitation.

Instead of pursuing the same result over a single subcarrier, the bit-loading technique implemented in block 12 of FIG. 1 guarantees a target BER over a set $\Omega$ of subcarriers with index $\Omega \subset \{i : 1 \leq i \leq N\}$; this is done using a metric based upon the LLRs.

The persons skilled in the art will appreciate that the fact of operating on a set of subcarriers suits the turbo codes structure where a code word coincides with an entire block of coded bits. It is known that each bit of both of the constituent encoders depends upon the entire coded sequence as a result of the infinite impulse response (IIR) of recursive convolutional encoders. This fact suggests that, in order to obtain the best results in terms of bit-loading, it is right to attempt to operate with packets and consequently with a set of subcarriers.

The fact of guaranteeing a target BER over a set of subcarrier indices $\Omega \subset \{i : 1 \leq i \leq N\}$, instead of over a single subcarrier (using a metric based upon the LLRs) does not mean that each subcarrier of $\Omega$ has to be loaded with the same constellation. This differs from what is taught in documents such as [16], [36], where the reason for operating over a set of subcarriers is that of reducing the complexity of the bit-loading algorithm, loading the same constellation on each subcarrier belonging to the same set.

First consider a single-carrier coded system, with additive white Gaussian noise (AWGN), with an SNR $\gamma$. It will likewise be assumed that the symbols transmitted belong to a constellation A, with $\log_2 (|A|) = m$ and have a symbol energy $E_s$. In addition, it will be assumed that $l_i$, with $i = 1, 2, \ldots, m$, is the LLR for the i-th bit at output from the SISO de-mapping module. It is pointed out that $l_i$ has the same structure as the one given by Eq. (6), with the exception of the subcarrier index.

In this context, the metrics introduced can be the following:

$$\bar{l}^{(m)} = \frac{1}{m} \sum_{i=1}^{m} E[10 \cdot \log_{10} |l_i|] = \gamma_{dB} + \underbrace{\frac{1}{m} \sum_{i=1}^{m} [10 \cdot \log_{10} |2 \cdot D_i|]}_{\Delta^{(m)}}. \quad (8)$$

where E[a] is the expected value of a and where $\gamma_{dB} = 10 \log_{10} \gamma$. Even though $\Delta_{(m)}$ depends upon $\gamma$, it is reasonable to state that, in the range of interest, $\Delta^{(m)}$ can be approximated with a constant value which can be tabulated and stored in a look-up table. Hence Eq. (8) allows predicting, at the transmitter side, the medium LLR at the output of the SISO de-mapper module only as a function of the estimated received signal to noise ratio.

In this connection, when dealing with the metrics corresponding to the constellation of highest rank available within the MCM system (in the case of the HPAV system the 1024-QAM constellation), it is to be considered that the range of application of all the other metrics is a compact interval on the axis of the signal-to-noise ratio, whilst the range of metrics associated with the constellation of highest rank amongst the ranks available is a right-unlimited interval. In this regard, in order to prevent this metric from assuming values that are too high as the signal-to-noise ratio increases, thus proving dominant when used in combination with the other metrics (as in Eq. (10)), in a possible embodiment it is envisaged that the metric is top limited by a saturation value, which can be determined, for example, via simulation.

As a consequence of Eq. (8), the target BER, which in the BTC algorithm is an SNR constraint (as in Eq. (7)) can be shifted into an LLR constraint as follows:

$$\begin{cases} \max_{m_k \in C} m_k \\ \text{s.t. } \bar{l}_k \geq \bar{l}^{(m_k,T)} \end{cases} \quad k = 1, \ldots, N, \tag{9}$$

where $\bar{l}_k = \gamma_{k,dB} + \Delta^{(m_k)}$ is the metric of Eq. (8), calculated on the subcarrier k, and $\bar{l}^{(m_k,T)} = \gamma_{dB}^{(m_k,T)} + \Delta^{(m_k)}$ expresses the equivalent LLR constraint. The possible dependence upon the code rate R and upon the interleaver length L already noted previously ($\gamma_{dB}^{(m_k,T,R,L)}$) here becomes $\bar{l}^{(m_k,T,R,L)}$. In what follows, for simplicity, it will be assumed that R and L are fixed, which, as may be readily understood by a person skilled in the sector, does not constitute a limitation.

As has already been said, the solution described herein aims at guaranteeing a value of target BER over a set of subcarrier indices $\Omega \subseteq \{i : 1 \leq i \leq N\}$, instead of over a single carrier.

Since, in a multiple-carrier system of an adaptive type, such as an HPAV system, each subcarrier can be loaded with a different constellation, an extension of the metric of Eq. (8) such as to weigh the contribution given by each subcarrier of the set $\Omega$ taking into account the modulation loaded is $$\bar{l} = \sum_{k \in \Omega} m_k \cdot \bar{l}_k \bigg/ \sum_{k \in \Omega} m_k \tag{10}$$

Consequently, the new problem can be synthesized as follows:

$$\begin{cases} \max_{\{m_k\} \in C^{|\Omega|}} \sum_{k \in \Omega} m_k \\ \text{s.t. } \bar{l}_k \geq \bar{l}^{(T)} \end{cases} \tag{11}$$

where $C^N$ is the set $$\underbrace{C \times C \times \ldots \times C}_{N \text{ times}}$$

and $\bar{l}^{(T)}$ can be obtained in several ways (for example, via simulation) and depends upon the target BER, the code rate R, and the interleaver length L. In order to take into account the effects of the SNR estimate, a margin must be introduced on $\bar{l}^{(T)}$.

Let $M \subseteq \Omega$ be the set of subcarrier indices on which it is possible to load an allocation of $m_k'$ bits, with $k \in M$. The metric of Eq. (10), generated by an allocation $m_k'$, with $k \in M$, and by $m_k$, with $k \in \{i : i \in \Omega, i \notin M\}$, can be expressed as follows:

$$\bar{l}' = \frac{\sum_{k \in \Omega} m_k \bar{l}_k - \sum_{k \in M} m_k \bar{l}_k + \sum_{k \in M} m_k' \bar{l}_k'}{\sum_{k \in \Omega} m_k - \sum_{k \in M} m_k + \sum_{k \in M} m_k'}, \tag{12}$$

where $\bar{l}_k' = \gamma_{k,dB} + \Delta^{(m_k')}$.

Defining the cost of shifting from the bit allocation $m_k$ to the bit allocation $m_k'$, on the subcarrier $k \in \Omega$, as $$w_k = m_k \bar{l}_k' - m_k \bar{l}_k, \tag{13}$$

the relation between the metric $\bar{l}'$ and the metric $\bar{l}$ of Eq. (10) becomes $$\bar{l}' = \frac{\bar{l} \sum_{k \in \Omega} m_k + \sum_{k \in M} w_k}{\sum_{k \in \Omega} m_k + \sum_{k \in M} (m_k' - m_k)}. \tag{14}$$

Figure 2:
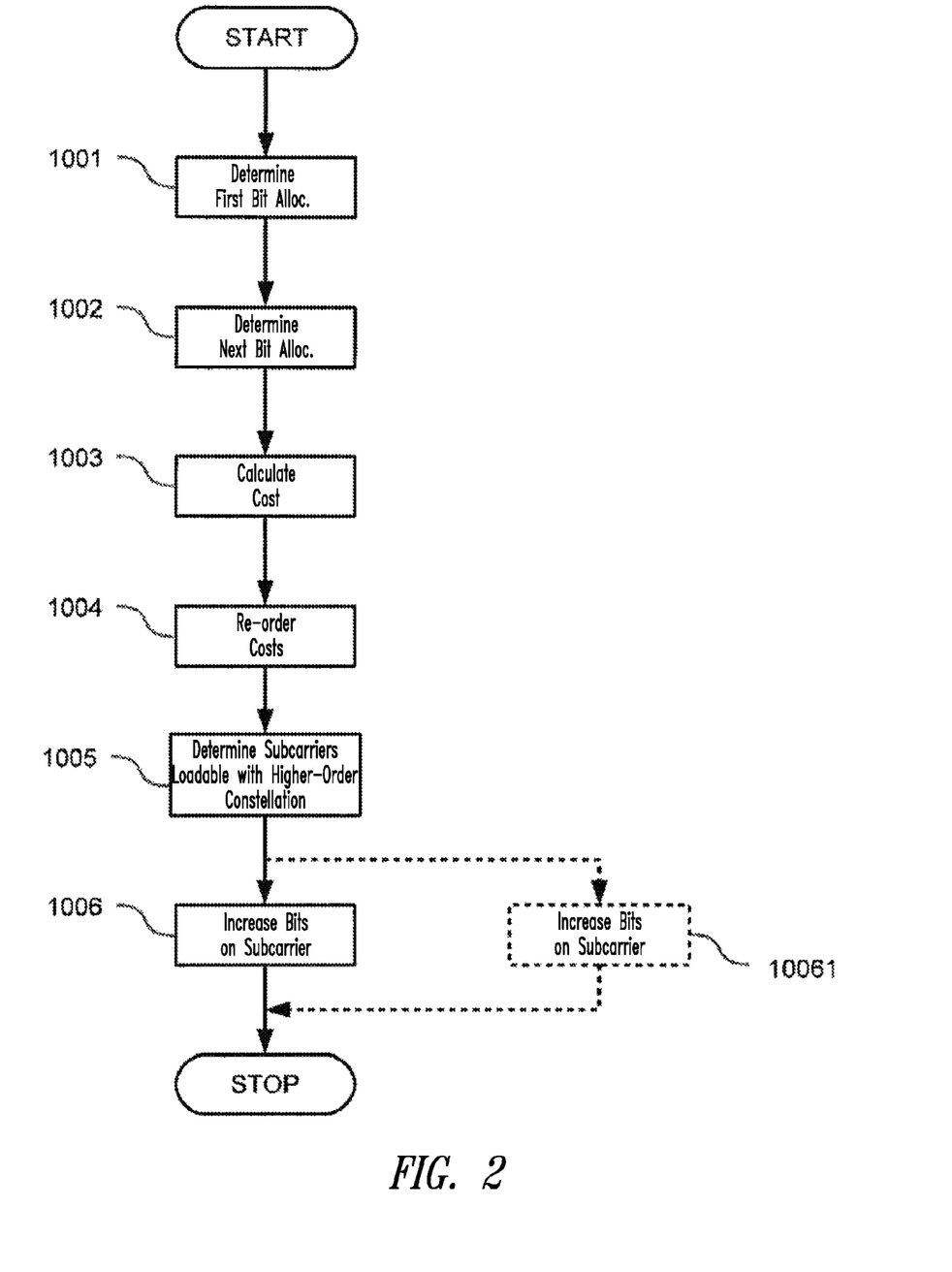
FIGS. 2 and 3 are two flowcharts representing different possible embodiments of the solution described herein.

The flowchart of FIG. 2 represents a procedure capable of solving the problem of loading that can be derived for a coded MCM system; namely, $$\begin{cases} \max_{\{m_k\} \in C^{|\Omega|}} \sum_{k \in \Omega} m_k \\ \text{s.t. } \bar{l} \geq \bar{l}^{(T)} \end{cases} \tag{15}$$

In general it may be assumed that the procedure starts with a bit allocation $\{m_k\}$ with k belonging to $\Omega$ determined on the basis of the BTC algorithm (see Eqs. (7) and (9)).

Since the BTC solution satisfies the BER constraint within ample margin, the algorithm shifts some subcarriers from one constellation to the immediately higher constellation if the constraint expressed in Eq. (15) is still valid.

In the specific case, the flowchart of FIG. 2 comprises, between a START step and a STOP step, a set of steps 1001 to 1006 that have the meaning outlined in what follows.

Step 1001

Determine a first bit allocation $\{m_k\}$, with $k \in \Omega$, for example, on the basis of the BTC algorithm.

Step 1002

Determine the bit allocation $\{m_k'\}$, with $k \in \Omega$, corresponding to the immediately higher bit allocation.

Step 1003

Calculate the cost $w_k$, $\forall k \in \Omega$ applying Eq. (13).

Step 1004

Re-order the set of the costs: $\{w_{\chi_1}, w_{\chi_2}, \ldots, w_{\chi_{|\Omega|}}\}$. The order $\chi$ determines the subcarriers with higher probability of being subject to a constellation shift. In one embodiment, the set can be re-ordered in such a way that: $w_{\chi_1} > w_{\chi_2} > \ldots > w_{\chi_{|\Omega|}}$ (LLR-constrained (LC) procedure of a decreasing (DLC) type). It will be appreciated that the invention is not in any way limited to this choice. The costs can be re-ordered according to other criteria; for example, it is possible to decide to shift first the constellations of lower order in a decreasing order of costs and only after shift the constellations of higher order. It is emphasized once again that the invention is in no way limited to a specific choice.

Step 1005

Proceeding, for example, with a dichotomic search algorithm, determine the subcarriers that can be loaded with a higher-order constellation, whilst still satisfying the constraint expressed by Eq. (15).

The search steps can be, for example:
a) initialize $\xi$ and its limits: $\xi=\lceil|\Omega|/2\rceil$, LOW=0, and UP=$|\Omega|$;
b) define the subset M={$\chi_i,1\leq i\leq\xi$};
c) determine $\bar{l}$ applying Eq. (14);
d) if $\bar{l}\geq \bar{l}^{(T)}$, update the lower limit and $\xi$:LOW←$\xi$ and $\xi$←$\lceil$(LOW+UP)/2$\rceil$;
e) if $\bar{l}<\bar{l}^{(T)}$, update the upper limit and $\epsilon$:UP←$\xi$ and $\xi$←$\lfloor$(LOW+UP)/2$\rfloor$;
f) if ($\xi\neq$LOW and $\xi\neq$UP) or if $\bar{l}<\bar{l}^{(T)}$, proceed to step b);
g) return M Step 1006

Increase to $m_k'$ the number of bits loaded on the subcarrier k, with k∈M.

In what follows, this bit-loading technique will be referred to, as already anticipated previously, as LLR-constrained (LC) technique. In the embodiment which refers to FIG. 2 only the shift to the immediately higher constellation is considered in a context where the update of a "tonemap" (which contains the modulation to be loaded on each subcarrier), after the first BTC allocation, is made only after determination of all the subcarriers to be shifted.

The persons skilled in the art will note that variants of the solution described above are possible, so that the scope of the invention is not certainly limited to the solution referred to in FIG. 2. For example, in step 1005, other initializations for the factor $\xi$ and its limits are possible. In addition, in another embodiment, instead of determining directly the set M, point d) can be replaced with the expression:

d) if $\bar{l}\geq\bar{l}^{(T)}$, proceed to step g)

and step 1006 can be reformulated as step 10061 (see FIG. 2) described hereinafter.

Step 10061

Increase to $m_k'$ the number of bits loaded on the subcarrier k, with k∉M. If ($\xi\neq$LOW and $\xi\neq$UP), return to the step 1002.

In this second embodiment, the possibility is considered of shifting more than once the constellation present on a subcarrier in a context of iterative tone-map updating.

The persons skilled in the art will observe that the performance in term of throughput of the proposed solution referred to FIG. 2 depends on the selected target LLR $\bar{l}^{(T)}$. Besides obtaining by simulation, three alternative ways can be suggested. In the first one, $\bar{l}^{(T)}$ is defined by:

$$\bar{l}^{(T)} = \max_{m \in C} \bar{l}^{(m,T)} \qquad (16)$$

where $\bar{l}^{(m,T)}$ are the target LLRs associated with a given target BER for each constellation as already defined. The target defined by Eq. (16) will be denoted as $\bar{l}^{(T_1)}$. The solution that employs this target is conservative in terms of BER since $\bar{l}^{(T_1)}$ turns to be over-dimensioned with respect to $\bar{l}^{(m,T)}$ for most m. A second way to define $\bar{l}^{(T)}$, that directly derives from the first, consists in choosing $$\bar{l}^{(T)} = \max_{k \in \Omega}\left\{\max\left\{\bar{l}^{(m_k^{BTC},T)},\bar{l}^{(m_k'^{BTC},T)}\right\}\right\}. \qquad (17)$$

Here {$m_k^{BTC}$} is the bit-loading distribution provided by the BTC algorithm on the set of sub-carrier indices $\Omega$ and $m_k'^{BTC}$ is the immediately higher bit allocation. This target will be denoted as $\bar{l}^{(T_2)}$. A solution that adopts $\bar{l}^{(T_2)}$ is less conservative in terms of BER with respect to a solution with the $\bar{l}^{(T_1)}$ choice because $\bar{l}^{(T_2)}\leq\bar{l}^{(T_1)}$. In fact $\bar{l}^{(T_2)}$ takes into account only the probably loaded modulations. For instance, if the system is working at low SNRs for every carrier in the subset $\Omega$, in a situation where only the BPSK and QPSK modulations will be probably loaded, $$\bar{l}^{(T_2)} = \max\{\bar{l}^{(1,T)},\bar{l}^{(2,T)}\}.$$

A third possible way to define $\bar{l}^{(T)}$ is:

$$\bar{l}^{(T)} = \sum_{k\in\Omega} m_k \cdot \bar{l}^{(m_k,T)} / \sum_{k\in\Omega} m_k. \qquad (18)$$

This target will be denoted as $\bar{l}^{(T_3)}$. It depends on the loaded constellations {$m_k$} with k∈$\Omega$; therefore a solution that uses $\bar{l}^{(T_3)}$ dynamically updates the target at each iteration of the dichotomic algorithm, i.e. point c of step 1005 is replaced with:

c) determine $\bar{l}$ applying Eq. (14); determine $\bar{l}^{(T)}$ using Eq. (18).

The skilled reader will note that the drawback of recomputing the target, for a solution that adopts the target $\bar{l}^{(T_3)}$, is compensated by some simplifications in the implementation of the proposed solution. In particular, with the $\bar{l}^{(T_3)}$ target, the problem of Eq. (15) is equivalent to $$\begin{cases}\max_{\{m_k\}\in C^{|\Omega|}} \sum_{k\in\Omega} m_k \\ \text{s.t. } \bar{\gamma}_{dB} \geq \bar{\gamma}_{dB}^{(T)},\end{cases} \qquad (19)$$

where $$\bar{\gamma}_{dB} = \sum_{k\in\Omega} m_k \cdot \gamma_{k,dB} \text{ and } \bar{\gamma}_{dB}^{(T)} = \sum_{k\in\Omega} m_k \cdot \gamma_{dB}^{(m_k,T)}.$$

Moreover, Eq. (12), which relates to the metric updating, can be simplified into $$\bar{\gamma}_{dB}' = \bar{\gamma}_{dB} + \sum_{k\in M}(m_k'-m_k)\gamma_{k,dB}. \qquad (20)$$

The simplifications of Eq. (19) and Eq. (20) suggest, instead of Eq. (13), the alternative cost computation:

$$w_k = m_k'(\gamma_{k,dB}-\gamma_{dB}^{(m_k',T)})-m_k(\gamma_{k,dB}-\gamma_{dB}^{(m_k,T)}), \qquad (21).$$

In fact, as the skilled reader will note, Eq. 21 that employs the distance between the measured SNRs and the target SNRs, can also be applied when targets different from $\bar{l}^{(T_3)}$ are chosen. A solution that uses the $\bar{l}^{(T_3)}$ target, though LLR-based, allows dealing in the implementation only with the SNRs. The persons skilled in the art will however understand that the proposed solution referred to FIG. 2 is by no way limited by the choice of $\bar{l}^{(T)}$ as long as this choice, together with the setting of parameters such as the cardinality of the set $\Omega$, agrees with the given target BER.

As may be readily appreciated by persons skilled in the sector, for some MCM systems, allocating on a subcarrier k the immediately higher constellation can give rise to a gain in terms of throughput that depends upon the modulation. In the HPAV system, if on the k-th subcarrier the 8-QAM modulation is present, by passing to the 16-QAM modulation a gain of 1 bit in terms of throughput is obtained. Instead, if the 64-QAM modulation is present, by passing to the 256-QAM modulation a gain of 2 bits in terms of throughput is obtained.

Consequently, it is possible to consider inserting in the costs as considered in step 1003 not only the costs inherent in the fact of passing from one constellation to an immediately higher constellation, but also the costs that correspond to the fact of making a double shift from one constellation to the other or costs that correspond to a combined shift of two constellations.

To clarify this point, the following example may be considered, once again in the framework of an HPAV system. We shall direct our attention, for example, to a system with three subcarriers, and likewise assume that the first allocation of step 1001 has led to loading a BPSK modulation on the first subcarrier, a 4-QAM modulation on the second subcarrier, and a 64-QAM modulation on the third subcarrier. Following the solution described, the costs $w_1$ (cost of loading the 4-QAM modulation on the subcarrier 1 with a gain of 1 bit), $w_2$ (cost of loading the 8-QAM modulation on the subcarrier 2 with a gain of 1 bit), and $w_3$ (cost of loading the 256-QAM modulation on the subcarrier 3 with a gain of 2 bits) can be calculated in step 1003 and re-ordered in step 1004 on the basis of a given criterion. However, at least in some cases, it may be advantageous to consider also the additional costs $w_{11}$ (cost linked to the fact of loading the 8-QAM modulation on the subcarrier 1 with a gain of 2 bits), $w_{22}$ (cost linked to the fact of loading the 16-QAM modulation on the subcarrier 2 with a gain of 2 bits) and $w_{12}=w_1+w_2$ (linked to the fact of loading simultaneously the 4-QAM modulation on the subcarrier 1 and the 8-QAM modulation on the subcarrier 2 with a throughput gain of 2 bits).

Figure 3:
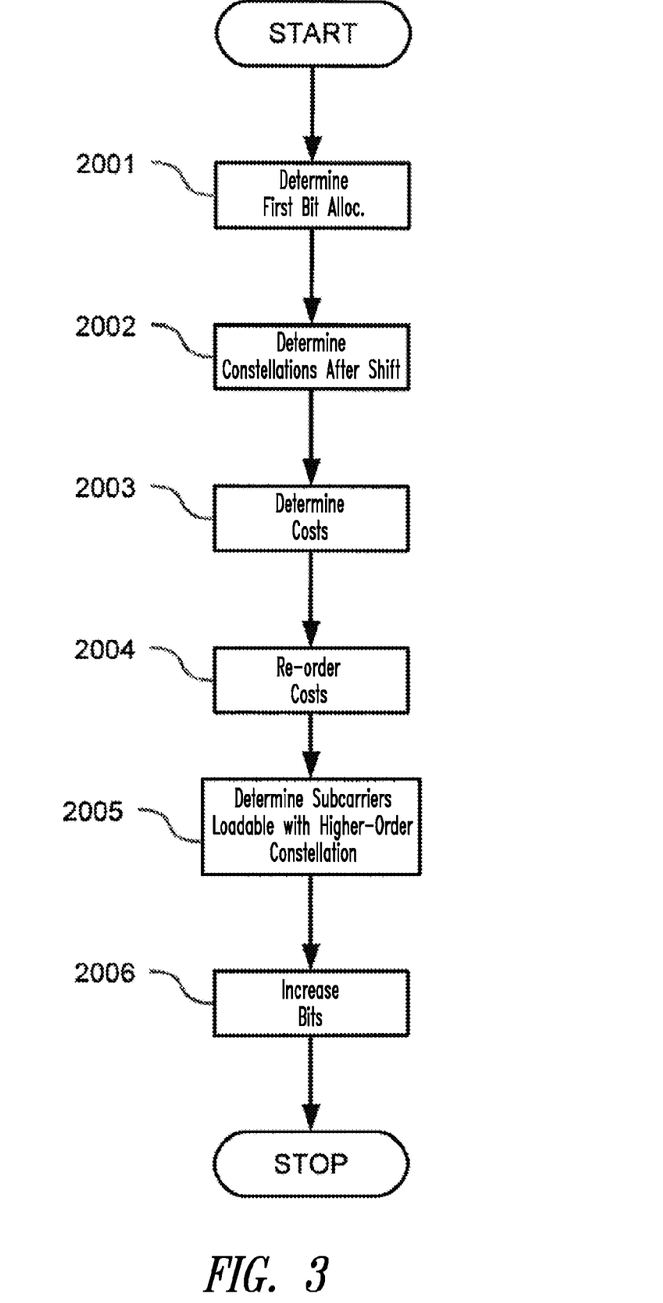

The flowchart of FIG. 3 represents a practical implementation of the heuristic criterion described previously.

In particular, it is here assumed that $b_{max}$ is the maximum gain in terms of number of bits obtained by shifting a constellation to the immediately higher available constellation. For example, in the HPAV system, $b_{max}=2$. Also in this case, the flowchart of FIG. 3 shows a sequence of steps 2001 to 2006 comprised between a START step and a STOP step. The meaning of the various blocks 2001 to 2006 is illustrated in detail in what follows.

Step 2001

Determine a first bit allocation $\{m_k\}$, with $k \in \Omega$, for example, on the basis of the BTC algorithm.

Step 2002

$\forall k \in \Omega$, determine $B_k'=\{m_k' \notin C: 0 < m_k'-m_k \le b_{max}\}$, i.e., the set of resulting constellations after the shift to be considered on the subcarrier k. For example, in the HPAV system $B_k'=\{m_k+1; m_k+2\}$ when $m_k \le 2$, $B_k'=\{m_k+1\}$ when $m_k=3$, $B_k'=\{m_k+2\}$ when $4 \le m_k \le 8$ and $B_k'=\{m_k\}$ when $m_k=10$.

Step 2003

Determine, applying Eq. (13), the sets $W_{b_{max}}=\{W_k: k \in \Omega, m_k' \notin B_k', m_k'-m_k=b_{max}\}$ $$W_{sum=b_{max}} = \bigcup_{v=2}^{b_{max}} \left\{ w_{k_1,k_2,\ldots,k_v} = w_{k_1} + w_{k_2} + \ldots w_{k_v} : k_j \in \Omega \forall j = 1, 2, \ldots, v, \sum_{j=1}^{v} m_{k_j}' - m_{k_j} = b_{max}, m_{k_j}' \in B_{k_j}' \right\}$$

as well as $W=W_{b_{max}} \cup W_{sum=b_{max}}$.

Here $W_{b_{max}}$ is the set of costs associated with the shift of a subcarrier with a throughput gain of $b_{max}$ bits (for example, in the HPAV system it comprises the cost of shifting a subcarrier initially loaded with the 64-QAM constellation onto the 256-QAM constellation; another example in the HPAV system is the cost of shifting a subcarrier initially loaded with the BPSK constellation onto the 8-QAM constellation).

The set $W_{sum=b_{max}}$ is, instead, the set of the costs associated with the shift of a set of two or more subcarriers which is able of lead to a throughput gain of $b_{max}$ total bits (for example, in the HPAV system it comprises the costs linked to the simultaneous shift from the BPSK constellation loaded on a subcarrier to the 4-QAM constellation and from the 8-QAM constellation loaded on another subcarrier to the 16-QAM constellation).

Finally, the set w is the set of all the possible costs associated with a total gain in terms of throughput equal to $b_{max}$ bits.

The set W may be expressed as follows:

$$W = \bigcup_{v=1}^{b_{max}} \left\{ w_{k_1,k_2,\ldots,k_v} = w_{k_1} + w_{k_2} + \ldots w_{k_v} : k_j \in \Omega \forall j = 1, 2, \ldots, v, \sum_{j=1}^{v} m_{k_j}' - m_{k_j} = b_{max}, m_{k_j}' \in B_{k_j}' \right\}$$

Let then $\alpha$ be the multiple-value function that maps each cost in W to the set of corresponding subcarriers, i.e., $\alpha(w_{k_1,k_2},\ldots,k_v)=\{k_1; k_2;\ldots,k_v\}$. Likewise, it is possible to define a mapping $\beta$, which associates the set of subcarriers $\{k_1; k_2;\ldots,k_v\}$ with the corresponding bits $m'_{k_j}$ to be allocated after the constellation shift.

Step 2004

Re-order the set of costs w according to an order $\chi$ to obtain an ordered set $W_\chi$. The order $\chi$ (in what follows, the notation $a\chi b$ indicates that a precedes b in the order $\chi$) determines the subcarriers with higher probability of being subjected to a constellation shift. In one embodiment, $\chi$ is the order $\ge$ (greater than or equal to), (decreasing LLR-constrained (DLC) procedure; it will be appreciated that the invention is in no way limited to this choice). Proceeding according to the order $\chi$, the costs that have an associated (sub)carrier in common with one of the previous costs are eliminated.

From the formal standpoint, if $\alpha(w_{k_1, k_2, \ldots, k_v}) \cap \alpha(w_{\tilde{k}_1, \tilde{k}_2, \ldots, \tilde{k}_v}) \ne \{ \}$ and $w_{k_1, k_2, \ldots, k_v} \chi w_{\tilde{k}_1, w\tilde{k}_2, w\tilde{k}_v}$ is eliminated from $W_\chi$. For reasons of clarity, we can write $$W_\chi = \left\{ w_{\chi_1}, w_{\chi_2}, \ldots, w_{\chi_{|W_\chi|}} \right\},$$

where $\alpha(w_{\chi_j})$ is in the form $\{k_1; k_2; \ldots; k_v\}$.

Step 2005

With a search procedure (also here it may be a dichotomic search algorithm), determine the subcarriers that can be loaded with a higher-order constellation, whilst still satisfying the constraint expressed by Eq. (15).

In one embodiment, the search comprises the following steps:

a) initialize $\xi$ and its limits: $\xi=\lceil |\Omega|/2 \rceil$, LOW=0, and UP=$|\Omega|$;

b) choose $$J = \underset{J}{\operatorname{argmax}}\left\{\left\|\bigcup_{j=1}^{J}\alpha(w_{\chi j})\right\| \leq \xi\right\}$$

and define the subset $$M = \bigcup_{j=1}^{J}\alpha(w_{\chi j});$$

c) determine $\overline{l}'$ applying Eq. (14);
d) if $\overline{l}' \geq \overline{l}^{(T)}$, update the lower limit and $\xi$: LOW←$\xi$ and $\xi$←⌈(LOW+UP)/2⌉;
e) if $\overline{l}' < \overline{l}^{(T)}$, update the upper limit and $\xi$:UP←$\xi$ and $\xi$←⌊(LOW+UP)/2⌋;
f) if ($\xi \neq$LOW and $\xi \neq$UP) or if $\overline{l}' \leq \overline{l}^{(T)}$, proceed to b);
g) return M Step 2006

Increase to the appropriate value $m'_k$ (for example, using the map β) the number of bits loaded on the subcarrier k ($m_k = m_k'$, k∉M), with k∉M; if $b_{max} \neq 0$, update $b_{max} \leftarrow b_{max}-1$ and proceed to step 2002.

Looking at this procedure, one might think that the calculation of the costs is cumbersome. However, from Eqs. (8) and (13) we have $$w_k = (m_k' - m_k)\gamma_{k,dB} + (m_k'\Delta^{(m_k')} - m_k\Delta^{(m_k)}). \tag{16}$$

It may be noted that in Eq. (16) the second addendum and the difference appearing in the first addendum can be calculated in advance and stored in a look-up table for each constellation available and each type of shift it is decided to allow, thus considerably simplifying the calculation of the costs. In addition, a person skilled in the sector will note that construction of $W = W_{b_{max}} \cup W_{sum=b_{max}}$ and re-ordering of the costs with the elimination of the redundant costs (steps 2003 and 2004) can be performed in parallel. For example, for the HPAV system, $W_{sum=b_{max}}$ is initially the set of costs $w_{k_1,k_2}$ associated to the shift of a set of two subcarriers that are loaded, after the first step of BTC, with a BPSK modulation or else with the 4-QAM or 8-QAM constellations. These costs result apparently from all the possible additions $w_{k_1} + w_{k_2}$ of the costs corresponding to the shift of said constellations.

However, it is possible to order the individual costs according to χ (for example, with $\chi = \geq w_{13} \geq w_{46} \geq w_2 \geq w_7 \geq w_{16} \geq w_{756} \geq w_{344} \geq w_{21} \geq w_{11} \geq w_{545} \ldots$).

This re-ordering can prove useful also after $b_{max} \leftarrow b_{max}-1$, and it is then possible to use this order (the complexity of which depends upon the χ chosen) for ordering and progressively eliminating the redundant costs corresponding to combined jumps or shifts (for example, $w_{13,46} \geq w_{2,7} \geq w_{16,756} \geq w_{344,21} \geq w_{11,545} \ldots$, without considering and calculating, for example, the costs $w_{13,k_2}$ for $k_2 \neq 46$). The person skilled in the art will understand that similar considerations are also valuable with other costs definitions such as the one of Eq. (21).

The operation of estimation of the signal-to-noise ratio (SNR) implemented in the module 10 is strictly linked to operation of the soft decoder and to execution of the bit-loading function.

In this regard, it is possible to use an SNR estimator for each subcarrier of the data-aided type, as described in [37]. This solution exploits known QPSK symbols transmitted during particular packets, referred to as "packet sounds". These are available in an HPAV system to enable estimation, for each subcarrier k, the value of SNR before starting the useful-data transmission. Since the estimator processes more than one OFDM symbol, it is possible to introduce an index that takes into account the number of OFDM symbols with reference to Eq. (4). The persons skilled in the art will note that the solution described herein in no way depends upon the choice of a particular SNR estimator, since results similar to the ones described herein can be achieved also with other reliable estimators.

Designating by s the number of known OFDM symbols transmitted during the packet sounds and by $\{a_k[i]\}$ the QPSK symbols transmitted on the k-th subcarrier during i-th OFDM symbol, the estimate of the value $\gamma_k$ of the SNR on the subcarrier may be determined as $$\hat{\gamma}_k = \frac{\frac{1}{S^2}\left|\sum_{i=1}^{S}\frac{y_k[i]}{a_k[i]}\right|^2}{\frac{1}{S}\sum_{i=1}^{S}|y_k[i]|^2 - \frac{1}{S^2}\left|\sum_{i=1}^{S}\frac{y_k[i]}{a_k[i]}\right|^2}. \tag{17}$$

Details regarding the derivation of the aforesaid SNR estimator can be found in [15].

The solution described herein has been tested with reference to different concrete environments, in particular with reference to a channel model of a power-line type. A characteristic of this type of channel is its cyclic variation as a function of the phase of the cycle of the AC line (see in this regard, for example, [38]). To obtain a high value of data rate, systems of this type must exploit this cyclic variation by dividing the AC cycle into a number of independent regions where the channel can be considered linear time invariant (see in this connection [39]). In each region, the adaptive bit-loading function is thus performed so as to determine the modulation to be used on each subcarrier. On the basis of this consideration, it is possible to define a linear time-invariant multi-path channel model, as described in [40]. In addition, according to [41], an additive colored Gaussian noise may be considered, generated by filtering a complex white Gaussian noise with a power spectral density $N_0$.

Particularly interesting results were achieved using, with reference to the solution described herein, the LC procedure with reference to a code rate R=1/2, and a turbo interleaver length L=544 within an HPAV turbo-coded system. As regards |Ω|, the value 229 was chosen. In defining this parameter, it is possible to follow two different approaches:

trying to match, during execution of the procedure, the number of bits allocated on the set of subcarriers defined by Ω with the length of the coded packet; and/or setting |Ω| at a value that is conservative for the majority of coded packets.

The first approach is more accurate and yields the best results but, when a number of OFDM symbols are transmitted in sequence, the bit-loading map changes from one OFDM symbol to another. This may prove undesirable since it can imply the presence of different tonemaps both at the transmitter end and at the receiver end to guarantee the LLR constraint for each coded packet.

The second approach also yields very good results as compared to the traditional BTC method, with the important difference as compared to the first approach represented by the fact that just one tonemap is stored, which enables saving in terms of hardware and a less frequent updating of the tonemap.

For example, if the second approach is adopted, it is possible to proceed in the following way:

a) find the coded-packet length $L_{cod}$. In the example considered here, $L_{cod}$=2176 bits.

b) find $$m_{max} = \max_{m \in C} m$$

and choose $|\Omega| \leq L_{cod}/m_{max}$. In the example considered here, $m_{max}$=10 and $L_{cod}/m_{max}$=217.6. In practice, the value $|\Omega|$=229 is preferred for practical reasons (it enables subsets of the same length within an OFDM symbol to be treated, thus simplifying the implementation).

In the first place, the performance for the two procedures considered herein (LC and BTC) was compared in terms of average system throughput with respect to the ratio $E_s/N_0$ in transmission, in the case of an ideal channel and knowledge of the SNR. The threshold $\bar{I}^{(T)}$ is fixed, and the throughput is calculated by averaging the bits allocated by the bit-allocation function over a number of realizations of the channel on the power line considered.

For a fixed BER equal to $P_e^{(T)}$=10$^{-3}$, the results show that the LC solution is far better than the BTC solution for all the values $E_s/N_0$. In particular, the improvement noted can be estimated at approximately 7.5% for $E_s/N_0$=0 dB and 13% for $E_s/N_0$=5 dB.

It is possible to increase further the robustness of the LC technique respecting the constraint in terms of BER by increasing the value of the threshold $\bar{I}^{(T)}$. This is useful in non-ideal conditions. In particular, it is possible to introduce a different threshold value for each S considered. The function $\bar{I}^{(T)}(S,E_s/N_0)$ may be readily implemented in the form of a look-up table, given above all that it is monotonic and decreasing function both with respect to S (which means that, as the estimate becomes more accurate, the margin introduced is reduced) and with respect to the ratio $E_s/N_0$ (as the variance of the estimate decreases, the margin introduced is also reduced). It may be shown that, for example, for a ratio $E_s/N_0$ of 5 dB the improvement in terms of throughput with respect to the BTC algorithm is equal to 2.5%, 8.5%, 10.7%, and 12.5% with values of S of 5, 10, and 40, respectively.

In brief, when a rough estimate (S=5) is made, the LC solution satisfies the BER requirements with a small improvement in terms of throughput with respect to the BTC algorithm. However, when more accurate estimates (S=10, 20 or 40) are made, the LC technique achieves the targets in terms of BER with a very significant improvement in terms of throughput as compared to the traditional BTC algorithm.

In brief, the solution described herein provides, in one possible embodiment, a bit-loading technique particularly suited for MCM systems, which uses a metrics in terms of LLRs at output from the SISO de-mapping module such as to satisfy BER target values on a subset of available subcarriers. This is achieved, whilst maximizing the throughput of the MCM system. The solution described herein has proven an improvement in terms of performance as compared to the BTC algorithm used traditionally. The possibility of varying certain parameters, such as the cardinality of the subset of the available subcarriers, and introducing margins on the threshold defined on the basis of the signal-to-noise ratio bestows upon the solution described herein an excellent flexibility and the capability of being optimized in various types of MCM communications systems.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

References

[1] J. C. A. C. Bingham, "Multicarrier modulation for data transmission, an idea whose time has come," *IEEE Comm. Magazine*, vol. 28, pp. 5-14, May 1990.

[2] L. Hanzo, W. Webb and T. Keller, "Single- and multi-carrier quadrature amplitude modulation: principles and applications for personal communications, WLANs and broadcasting," pp. 501-512, Chichester, UK, Wiley, 2000.

[3] Berrou, A. Glavieux and P. Thitimajshima, "Near Shannon limit error-correcting coding and decoding: Turbo-codes I," *IEEE ICC* 1993, pp. 1064-1070, May 1993.

[4] A. Ghosh, D. R. Wolter, J. G. Andrews and R. Chen, "Broadband wireless access with WiMax/802.16: current performance benchmarks and future potential," *IEEE Comm. Magazine*, vol. 42, pp. 129-136, February 2005.

[5] HomePlug PowerLine Alliance, "HomePlug AV baseline specification," Version 1.1, May 2007.

[6] "HomePlug AV white paper," http://www.homeplug.org.

[7] L. Guerrieri and P. Bisaglia, "Method of approximating log-likelihood ratios in QAM digital transmissions and relative QAM soft-output de-mapper," Italian patent application VA2007A000032.

[8] J. Campello, "Optimal discrete bit loading for multicarrier modulation systems," *IEEE Symp. Info. Theory*, p. 193, August 1998.

[9] A. Leke and J. M. Cioffi, "A maximum rate loading algorithm for discrete multitone modulation systems," *IEEE Globecom* 1997, pp. 1514-1518, November 1997.

[10] B. S. Krongold, K. Ramchandran and D. L. Jones, "Computationally efficient optimal power allocation algorithms for multicarrier communication systems," *IEEE Trans. on Comm.*, vol. 48, pp. 23-27, January 2000.

[11] P. S. Chow, J. M. Cioffi and J. A. C. Bingham, "A practical discrete multitone transreceiver loading algorithm for data transmission over spectrally shaped channels," *IEEE Trans. on Comm.*, vol. 43, pp. 773-775, April 1995.

[12] R. F. H. Fisher, J. B. Huber, "A new loading algorithm for discrete multitone transmission," *IEEE Globecom* 1996, pp. 724-728, November 1996.

[13] J. Campello, "Practical bit loading for DMT," *IEEE ICC* 1999, pp. 801-805, June 1999.

[14] A. M. Wyglinsky, F. Labeau and P. Kabal, "Bit loading with BER-constraint for multicarrier systems," *IEEE Trans. on Wireless Comm.*, vol. 4, pp. 1383-1387, July 2005.

[15] E. Guerrini, G. Dell'Amico, P. Bisaglia and L. Guerrieri, "Bit-loading algorithms and SNR estimates for HomePlug AV," *IEEE ISPLC* 2007, pp. 77-82, March 2007.

[16] X. She, S. Zhou, X. Xu and Y. Yao, "Power and bit allocation for adaptive turbo coded modulation in OFDM systems", *IEEE Globecom* 2003, pp. 903-907, December 2003.

[17] N. Benvenuto and F. Tosato, "On the selection of adaptive modulation and coding modes over OFDM," *IEEE ICC* 2004, pp. 3251-3255, 2004.

[18] R. V. Sonalkar and R. R. Shively, "An efficient bit-loading algorithm for DMT applications," *IEEE GLOBECOM* 1988, pp. 2683-2698, November 1988.

[19] E. Baccarelli, A. Fasano and M. Biagi, "Novel efficient bit-loading algorithms for peak-energy-limited ADSL-type multicarrier systems," *IEEE Transactions on Signal Processing*, vol. 50, pp. 1237-1247, May 2002.

[20] S. Kapoor and P. Choudary, "Method and apparatus for discrete multitone communication bit allocation," U.S. Pat. No. 6,516,027 B1, February 1999.

[21] A. Storm, "Method for bit assignment and fine gain setting in a multi-carrier communication system," U.S. Pat. No. 7,177,367 B2, January 2002.

[22] M. Isaksson, M. Johansson, H. Tonvall, L. Olsson, T. Stefansson, H. Ohman, G. Bahlenberg, A. Isaksson, G. Okvist, L. Ljunggren, T. Nordstrom, L. Isaksson, D. Bengtsson, S. Hakansson and Y. Wen, "Multi-carrier transmission system," U.S. Pat. No. 6,181,714 B1, September 1997.

[23] J. Brossier and F. Lehmann, "Process for modulation and determination of the bit loading on a transmission channel," U.S. Pat. No. 7,187,717 B2, March 2003.

[24] V. Mitlin and R. G. C. Williams, "Performance evaluation of multicarrier channels," U.S. Pat. No. 7,131,038 B2, December 2000.

[25] J. M. Shapiro, S. D. Sandberg and M. C. Tzannes, "Bit allocation among carriers in multicarrier communications," U.S. Pat. No. 6,870,888 B1, November 1999.

[26] Y. Li and W. E. Ryan, "Mutual-information-based adaptive bit-loading algorithms for LDPC-coded OFDM," *IEEE Transactions on Wireless Communications*, vol. 6, pp. 1670-1680, May 2007.

[27] C. Berrou, M. Jezequel, C. Douillard and S. Kerouedan, "The advantages of non-binary turbo codes," *IEEE Proceedings of the Information Theory Workshop* 2001, pp. 61-63, September 2001.

[28] C. Berrou, M. Jezequel and C. Douillard, "Multidimensional turbo codes," *IEEE Information Theory and Networking Workshop* 1999, p. 27, July 1999.

[29] E. A. Gelblum and H. R. Sadjapour, "Multi-channel parallel/serial concatenated convolutional codes and trellis coded modulation encoder/decoder," U.S. Pat. No. 6,842,491, B2, May 2002.

[30] Y. Goldstein and Y. Okunev, "Mode adaptation in wireless systems," U.S. Pat. No. 7,203,459 B2, April 2003.

[31] M. Tzannes, G. Kechriotis and P. Wu, "Adaptive allocation for variable bandwidth multicarrier communication," U.S. Pat. No. 6,072,779, Jun. 1997.

[32] H. E. Levin and N. D. Teitler, "Method for reallocating data in a discrete multi-tone communication system," U.S. Pat. No. 6,122,247, Nov. 1997.

[33] L. R. Bahl, J. Cocke, F. Jelinek and J. Raviv, "Optimal decoding of linear codes for minimizing symbol-error rate," *IEEE Trans. On Inform. Theory*, vol. 20, pp. 284-287, March 1974.

[34] J. Vogt and A. Finger, "Improving the max-log MAP turbo decoder," *IEEE Elect. Lett*, vol. 36, pp. 1937-1938, November 2000.

[35] L. Guerrieri, P. Bisaglia, G. Dell'Amico and E. Guerrini, "Performance of the turbo coded HomePlug AV system over power line channels," *IEEE ISPLC* 2007, pp. 138-143, March 2007.

[36] L. Ye and A. Burr, "Adaptive modulation and code rate for turbo coded OFDM transmissions," IEEE VTC 2007, pp. 2702-2706, April 2007.

[37] D. R. Pauluzzi and N.C. Beaulieu, "A comparison of SNR estimation techniques for the AWGN channel," *IEEE Trans. On Comm.*, vol. 4, pp. 1681-1691, October 2000.

[38] F. J. Canete, J. A. Cortes, L. Diez, J. T. Entrabasaguas and J. L. Carmona, "Fundamentals of the cyclic short-time variation of the indoor power-line channels," *IEEE ISPLC* 2005, pp. 157-161, April 2005.

[39] S. Katar, B. Mashburn, K. Afkhamie, H. Latchman and R. Newman, "Channel adaptation based on cyclo-stationary noise characteristics in PLC systems," *IEEE ISPLC* 2006, pp. 16-21, March 2006.

[40] H. Phillips, "Modeling of powerline communication channels," *ISPLC* 1996, pp. 724-728, Nov. 1996.

[41] M. Zimmermann and K. Dostert, "Analysis and modeling of impulsive noise in broad-band powerline communications," *IEEE Trans. On Elect. Comp.*, vol. 44, pp. 249-258, February 2002.

The invention claimed is:

1. A method, comprising:
defining a performance target for a multiple-carrier communications system;
configuring said multiple-carrier communications system for transmitting packet data with a coded-data packet length;
loading bits over a set $\Omega$ of subcarriers of said multiple-carrier communications system, the loading including associating with said subcarriers respective numbers of bits chosen from amongst a plurality of available constellations, and guaranteeing said performance target on a plurality of said subcarriers; and
choosing a cardinality of said set $\Omega$ of subcarriers as a function of said coded-data packet length.

2. The method according to claim 1, wherein:
defining said performance target includes defining said performance target as target error rate for said multiple-carrier communications system; and
guaranteeing said performance target includes guaranteeing said target error rate on the plurality of said subcarriers.

3. The method according to claim 2, wherein said target error rate is a bit-error rate.

4. The method according to claim 1, wherein said set $\Omega$ of subcarriers is a subset of carriers available in said multiple-carrier communications system.

5. The method according to claim 4, including:
transferring said performance target into a constraint in a metric of log-likelihood ratios, wherein transferring said performance target includes defining said performance target as a threshold in said metric of log-likelihood ratios;
estimating, on signals received in said multiple-carrier communications system, a signal to noise ratio on each subcarrier of said subcarriers; and
determining said metric of log-likelihood ratios as a function of said signal to noise ratios.

6. The method according to claim 1, including configuring said multiple-carrier communications system for transmitting data coded with a turbo code.

7. A method, comprising:
defining a performance target for a multiple-carrier communications system;
loading bits over a set $\Omega$ of subcarriers of said multiple-carrier communications system, the loading including associating with said subcarriers respective numbers of bits chosen from amongst a plurality of available constellations, and guaranteeing said performance target on a plurality of said subcarriers;
transferring said performance target into a constraint in a metric of log-likelihood ratios, wherein the associating, with each subcarrier identified by a symbol k within said set $\Omega$, comprises:
determining for said subcarriers a first bit allocation $\{m_k\}$, with $k \in \Omega$;
determining for said subcarriers a second bit allocation $\{m_k'\}$, with $k \in \Omega$; corresponding to a bit allocation immediately higher than said first bit allocation;
calculating for said subcarriers a cost $w_k$, $\forall k \in \Omega$, associated with shifting from said first bit allocation to said second bit allocation, said shifting involving shifting to a higher-order constellation;
ordering said costs $\{w_{\chi_1}, w_{\chi_2}, \ldots, w_{\chi_{|\Omega|}}\}$ according to an order $\chi$ that determines subcarriers with greater probability of being subject to a constellation shift;
seeking, following said order, subcarriers that can be loaded with a higher-order constellation, whilst satisfying said constraint in the metric of log-likelihood ratios; and
increasing to said second bit allocation, $m_k'$, the number of bits loaded on said subcarriers that can be loaded with a higher-order constellation, identified with said seeking.

8. The method according to claim 7, wherein said set $\Omega$ of subcarriers is a subset of carriers available in said multiple-carrier communications system, the method including:
configuring said multiple-carrier communications system for transmitting packet data with a coded-data packet length; and
choosing a cardinality of said set $\Omega$ of subcarriers as a function of said coded-data packet length.

9. A method, comprising:
defining a performance target for a multiple-carrier communications system;
loading bits over a set $\Omega$ of subcarriers of said multiple-carrier communications system, the loading including associating with said subcarriers respective numbers of bits chosen from amongst a plurality of available constellations, and guaranteeing said performance target on a plurality of said subcarriers;
transferring said performance target into a constraint in a metric of log-likelihood ratios, wherein the associating, with each subcarrier identified by a symbol k within said set $\Omega$, comprises
determining for said subcarriers a first bit allocation $\{m_k\}$, with $k \in \Omega$;
determining for said subcarriers a set $B_k' = \{m_k' \in C: 0 < m_k' - m_k \leq b_{max}\}$ of constellations resulting from shifting from said first bit allocation $\{m_k\}$ to a second bit allocation $\{m_k'\}$ corresponding to a higher-order constellation with a throughput gain of $b_{max}$ bits;
determining a set of costs W representing costs of shifting allocation of said subcarriers associated with an overall throughput gain equal to $b_{max}$ bits;
ordering said set of costs W to obtain an ordered set $W_\chi$ ordered according to an order $\chi$ that identifies subcarriers that may with greater probability be subjected to a constellation shift, eliminating costs that have an associated subcarrier in common with one of the previous costs in the order $\chi$;
seeking subcarriers that can be loaded with a higher-order constellation, whilst satisfying said constraint in the metric of log-likelihood ratios; and
increasing to said second bit allocation, $m_k'$, the number of bits loaded on said subcarriers that can be loaded with a higher-order constellation, which are identified with said seeking.

10. The method according to claim 9, wherein the associating includes verifying whether $b_{max} \neq 0$, and, if so, updating $b_{max} \leftarrow b_{max} - 1$, thus repeating said determining for said subcarriers the set $B_k' = \{m_k' \in C: 0 < m_k' - m_k \leq b_{max}\}$ of constellations with said updated value of $b_{max}$.

11. The method according to claim 9, wherein determining said set of costs W includes determining said set of costs W as a union $W = W_{b_{max}} \cup W_{sum=b_{max}}$ of:
a first set $W_{b_{max}}$ of the costs associated with shifting said subcarriers from said first bit allocation to said second bit allocation with a throughput gain of $b_{max}$ bits; and
a second set $W_{sum=b_{max}}$ of costs associated with simultaneously shifting a set of two or more of said subcarriers from said first bit allocation to said second bit allocation with an overall throughput gain of $b_{max}$ bits.

12. The method according to claim 9, wherein the ordering includes ordering said set of costs W in decreasing order.

13. A transmitter device for a multiple-carrier communications system, comprising:
a bit-loading module configured to associate with subcarriers of said multiple-carrier communications system respective numbers of bits chosen from among a plurality of available constellations, the bit-loading module including:
defining means for defining a performance target for a multiple-carrier communications system; and
configuring means for configuring said multiple-carrier communications system for transmitting packet data with a coded-data packet length;
loading means for loading bits over a set $\Omega$ of subcarriers of said multiple-carrier communications system, the loading means including associating means for associating with said subcarriers respective numbers of bits chosen from amongst a plurality of available constellations, and guaranteeing said performance target on a plurality of said subcarriers; and
choosing means for choosing a cardinality of said set $\Omega$ of subcarriers as a function of said coded-data packet length.

14. The transmitter device according to claim 13, wherein:
said defining means defines said performance target includes defining said performance target as target error rate for said multiple-carrier communications system; and
said loading means guarantees said target error rate on the plurality of said subcarriers.

15. The transmitter device according to claim 13, further comprising:
means for transferring said performance target into a constraint in a metric of log-likelihood ratios;
means for estimating, on signals received in said multiple-carrier communications system, a signal to noise ratio on each subcarrier of said subcarriers; and
means for determining said metric of log-likelihood ratios as a function of said signal to noise ratios.

16. A transmitter device for a multiple-carrier communications system, comprising:
a bit-loading module configured to associate with subcarriers of said multiple-carrier communications system respective numbers of bits chosen from among a plurality of available constellations, the bit-loading module including:
defining means for defining a performance target for a multiple-carrier communications system; and
loading means for loading bits over a set $\Omega$ of subcarriers of said multiple-carrier communications system, the loading means including associating means for associating with said subcarriers respective numbers of bits chosen from amongst a plurality of available constellations, and guaranteeing said performance target on a plurality of said subcarriers;
means for transferring said performance target into a constraint in a metric of log-likelihood ratios, wherein the associating means, with each subcarrier identified by a symbol k within said set $\Omega$, comprises:
first determining means for determining for said subcarriers a first bit allocation $\{m_k\}$, with $k \in \Omega$;
second determining means for determining for said subcarriers a second bit allocation $\{m_k'\}$, with $k \in \Omega$, corresponding to a bit allocation immediately higher than said first bit allocation;
calculating means for calculating for said subcarriers a cost $w_k$, $\forall k \in \Omega$, associated with shifting from said first bit allocation to said second bit allocation, said shifting involving shifting to a higher-order constellation;
means for ordering said costs $\{w_{\chi_1}, w_{\chi_2}, \ldots, w_{\chi_{|\Omega|}}\}$ according to an order $\chi$ that determines subcarriers with greater probability of being subject to a constellation shift;
means for seeking, following said order, subcarriers that can be loaded with a higher-order constellation, whilst satisfying said constraint in the metric of log-likelihood ratios; and
means for increasing to said second bit allocation, $m_k'$, the number of bits loaded on said subcarriers that can be loaded with a higher-order constellation, identified with said seeking.

17. A transmitter device for a multiple-carrier communications system, comprising:
a bit-loading module configured to associate with subcarriers of said multiple-carrier communications system respective numbers of bits chosen from among a plurality of available constellations, the bit-loading module including:
defining means for defining a performance target for a multiple-carrier communications system; and
loading means for loading bits over a set $\Omega$ of subcarriers of said multiple-carrier communications system, the loading means including associating means for associating with said subcarriers respective numbers of bits chosen from amongst a plurality of available constellations, and guaranteeing said performance target on a plurality of said subcarriers;
means for transferring said performance target into a constraint in a metric of log-likelihood ratios, wherein the associating means, with each subcarrier identified by a symbol k within said set $\Omega$, comprises:
first determining means for determining for said subcarriers a first bit allocation $\{m_k\}$, with $k \in \Omega$;
second determining means for determining for said subcarriers a set $B_k' = \{m_k' \in C : 0 < m_k' - m_k \leq b_{max}\}$ of constellations resulting from shifting from said first bit allocation $\{m_k\}$ to a second bit allocation $\{m_k'\}$ corresponding to a higher-order constellation with a throughput gain of $b_{max}$ bits;
third determining means for determining a set of costs W representing costs of shifting allocation of said subcarriers associated with an overall throughput gain equal to $b_{max}$ bits;
ordering means for ordering said set of costs W to obtain an ordered set $W_{102}$ ordered according to an order $\chi$ that identifies subcarriers that may with greater probability be subjected to a constellation shift, eliminating costs that have an associated subcarrier in common with one of the previous costs in the order $\chi$;
seeking means for seeking subcarriers that can be loaded with a higher-order constellation, whilst satisfying said constraint in the metric of log-likelihood ratios; and
increasing means for increasing to said second bit allocation, $m_k'$, the number of bits loaded on said subcarriers that can be loaded with a higher-order constellation, which are identified with said seeking.

18. The transmitter device according to claim 17, wherein the associating means includes means for verifying whether $b_{max} \neq 0$, and, if so, updating $b_{max} \leftarrow b_{max} - 1$, and repeating said determining for said subcarriers the set $B_k' = \{m_k' \in C : 0 < m_k' - m_k \leq b_{max}\}$ of constellations with said updated value of $b_{max}$.

19. A non-transitory computer-readable medium having contents that cause a computing device to perform a method comprising:
defining a performance target for a multiple-carrier communications system;
loading bits over a set $\Omega$ of subcarriers of said multiple-carrier communications system, the loading including associating with said subcarriers respective numbers of bits chosen from amongst a plurality of available constellations, and guaranteeing said performance target on a plurality of said subcarriers; and
choosing a cardinality of said set $\Omega$ of subcarriers as a function of said coded-data packet length.

20. The computer-readable medium according to claim 19, wherein:
defining said performance target includes defining said performance target as target error rate for said multiple-carrier communications system; and
guaranteeing said performance target includes guaranteeing said target error rate on the plurality of said subcarriers.

21. The computer-readable medium according to claim 19, wherein the method includes:
transferring said performance target into a constraint in a metric of log-likelihood ratios;
estimating, on signals received in said multiple-carrier communications system, a signal to noise ratio on each subcarrier of said subcarriers; and
determining said metric of log-likelihood ratios as a function of said signal to noise ratios.

22. A non-transitory computer-readable medium having contents that cause a computing device to perform a method comprising:
defining a performance target for a multiple-carrier communications system;
loading bits over a set $\Omega$ of subcarriers of said multiple-carrier communications system, the loading including associating with said subcarriers respective numbers of bits chosen from amongst a plurality of available constellations, and guaranteeing said performance target on a plurality of said subcarriers;

transferring said performance target into a constraint in a metric of log-likelihood ratios, wherein the associating, with each subcarrier identified by a symbol k within said set $\Omega$, comprises:

determining for said subcarriers a first bit allocation $\{m_k\}$, with $k\epsilon\Omega$;

determining for said subcarriers a second bit allocation $\{m_k'\}$, with $k\epsilon\Omega$, corresponding to a bit allocation immediately higher than said first bit allocation;

calculating for said subcarriers a cost $w_k$, $\forall k\epsilon\Omega$, associated with shifting from said first bit allocation to said second bit allocation, said shifting involving shifting to a higher-order constellation;

ordering said costs $\{w_{\chi_1}, w_{\chi_2}, \ldots, w_{\chi_{|\Omega|}}\}$ according to an order $\chi$ that determines subcarriers with greater probability of being subject to a constellation shift;

seeking, following said order, subcarriers that can be loaded with a higher-order constellation, whilst satisfying said constraint in the metric of log-likelihood ratios; and increasing to said second bit allocation, $m_k'$, the number of bits loaded on said subcarriers that can be loaded with a higher-order constellation, identified with said seeking.

23. The computer-readable medium according to claim 22, wherein said set $\Omega$ of subcarriers is a subset of carriers available in said multiple-carrier communications system, the method including:

configuring said multiple-carrier communications system for transmitting packet data with a coded-data packet length; and choosing a cardinality of said set $\Omega$ of subcarriers as a function of said coded-data packet length.

24. A non-transitory computer-readable medium having contents that cause a computing device to perform a method comprising:

defining a performance target for a multiple-carrier communications system;

loading bits over a set $\Omega$ of subcarriers of said multiple-carrier communications system, the loading including associating with said subcarriers respective numbers of bits chosen from amongst a plurality of available constellations, and guaranteeing said performance target on a plurality of said subcarriers;

transferring said performance target into a constraint in a metric of log-likelihood ratios, wherein the associating, with each subcarrier identified by a symbol k within said set $\Omega$, comprises:

determining for said subcarriers a first bit allocation $\{m_k\}$, with $k\epsilon\Omega$;

determining for said subcarriers a set $B_k'=\{m_k'\epsilon C: 0<m_k'-m_k\leq b_{max}\}$ of constellations resulting from shifting from said first bit allocation $\{m_k\}$ to a second bit allocation $\{m_k'\}$ corresponding to a higher-order constellation with a throughput gain of $b_{max}$ bits;

determining a set of costs W representing costs of shifting allocation of said subcarriers associated with an overall throughput gain equal to $b_{max}$ bits;

ordering said set of costs W to obtain an ordered set $W_\chi$ ordered according to an order $\chi$ that identifies subcarriers that may with greater probability be subjected to a constellation shift, eliminating costs that have an associated subcarrier in common with one of the previous costs in the order $\chi$;

seeking subcarriers that can be loaded with a higher-order constellation, whilst satisfying said constraint in the metric of log-likelihood ratios; and increasing to said second bit allocation, $m_k'$, the number of bits loaded on said subcarriers that can be loaded with a higher-order constellation, which are identified with said seeking.

25. The computer-readable medium according to claim 24, wherein the associating includes verifying whether $b_{max}\neq 0$ and, if so, updating $b_{max}\leftarrow b_{max}-1$, thus repeating said determining for said subcarriers the set $B_k'=\{m_k'\epsilon C: 0<m_k'-m_k\leq b_{max}\}$ of constellations with said updated value of $b_{max}$.

26. The computer-readable medium according to claim 25, wherein determining said set of costs W includes determining said set of costs W as a union $W=W_{b_{max}}\cup W_{sum=b_{max}}$ of:

a first set $W_{b_{max}}$ of the costs associated with shifting said subcarriers from said first bit allocation to said second bit allocation with a throughput gain of $b_{max}$ bits; and a second set $W_{sum=b_{max}}$ of costs associated with simultaneously shifting a set of two or more of said subcarriers from said first bit allocation to said second bit allocation with an overall throughput gain of $b_{max}$ bits.

* * * * *

UNITED STATES PATENT AND TRADEMARK OFFICE
CERTIFICATE OF CORRECTION

PATENT NO. : 8,290,070 B2
APPLICATION NO. : 12/323291
DATED : October 16, 2012
INVENTOR(S) : Lorenzo Guerrieri et al.

It is certified that error appears in the above-identified patent and that said Letters Patent is hereby corrected as shown below:

In the Claims:

Column 24, Line 9, in Claim 17:
"ordered set $W_{102}$ ordered according to an order $\chi$ that" should read, --ordered set $W_\chi$ ordered according to an order $\chi$ that--.

Column 26, Line 35, in Claim 26:
"said set of costs Was a union" should read, --said set of costs $W$ as a union--.

Signed and Sealed this
Fifteenth Day of January, 2013

David J. Kappos
*Director of the United States Patent and Trademark Office*